United States Patent
Gero

(10) Patent No.: US 12,309,141 B2
(45) Date of Patent: *May 20, 2025

(54) BROWSER EXTENSIONLESS PHISH-PROOF MULTI-FACTOR AUTHENTICATION (MFA)

(71) Applicant: Akamai Technologies, Inc., Cambridge, MA (US)

(72) Inventor: Charles E. Gero, Quincy, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/636,468

(22) Filed: Apr. 16, 2024

(65) Prior Publication Data

US 2024/0275778 A1 Aug. 15, 2024

Related U.S. Application Data

(63) Continuation of application No. 17/528,504, filed on Nov. 17, 2021, now Pat. No. 11,962,580.

(51) Int. Cl.
*H04L 9/40* (2022.01)
(52) U.S. Cl.
CPC .................................. *H04L 63/083* (2013.01)
(58) Field of Classification Search
CPC .... H04L 63/083; H04L 63/08; H04L 63/0815
See application file for complete search history.

(56) References Cited

U.S. PATENT DOCUMENTS

| | | | | |
|---|---|---|---|---|
| 10,666,620 | B1* | 5/2020 | Clemons | H04L 63/0236 |
| 2006/0021018 | A1* | 1/2006 | Hinton | H04L 63/0815 |
| | | | | 726/10 |
| 2009/0259753 | A1* | 10/2009 | Hinton | H04L 63/0815 |
| | | | | 709/226 |
| 2013/0174241 | A1* | 7/2013 | Cha | H04L 63/0815 |
| | | | | 726/7 |
| 2013/0227658 | A1* | 8/2013 | Leicher | H04L 63/0876 |
| | | | | 726/5 |
| 2014/0101446 | A1* | 4/2014 | Lekies | H04L 9/3226 |
| | | | | 713/169 |
| 2014/0201809 | A1* | 7/2014 | Choyi | H04L 63/105 |
| | | | | 726/3 |
| 2017/0230351 | A1* | 8/2017 | Hallenborg | H04L 63/08 |

(Continued)

*Primary Examiner* — J. Brant Murphy
(74) *Attorney, Agent, or Firm* — David H. Judson

(57) ABSTRACT

A multi-factor authentication scheme uses an MFA authentication service and a browser extensionless phish-proof method to facilitate an MFA workflow. Phish-proof MFA verifies that the browser the user is in front of is actually visiting the authentic (real) site and not a phished site. This achieved by only allowing MFA to be initiated from a user trusted browser by verifying its authenticity through a signing operation using a key only it possesses, and then also verifying that the verified browser is visiting the authentic site. In a preferred embodiment, this latter check is carried out using an iframe postMessage owning domain check. In a variant embodiment, the browser is verified to be visiting the authentic site through an origin header check. By using the iframe-based or ORIGIN header-based check, the solution does not require a physical security key (such as a USB authenticator) or any browser extension or plug-in.

8 Claims, 5 Drawing Sheets

(56) References Cited

U.S. PATENT DOCUMENTS

| | | | |
|---|---|---|---|
| 2017/0237734 A1* | 8/2017 | Hallenborg | H04W 12/069 |
| | | | 726/7 |
| 2017/0269816 A1* | 9/2017 | Bradley | G10L 13/027 |
| 2017/0346851 A1* | 11/2017 | Drake | H04L 9/0838 |
| 2021/0281559 A1* | 9/2021 | Valecha | H04L 63/0853 |
| 2022/0385656 A1* | 12/2022 | Gujarathi | H04L 63/0876 |
| 2023/0020656 A1* | 1/2023 | Momchilov | H04L 63/10 |

* cited by examiner

BROWSER EXTENSIONLESS PHISH-PROOF MULTI-FACTOR AUTHENTICATION (MFA)

BACKGROUND OF THE INVENTION

This application relates generally to information security over networks.

Eighty percent of reported security breaches involve compromised user credentials or poor password hygiene. These vulnerabilities can result in account takeovers that allow attackers to obtain initial access, then move laterally to discover and exfiltrate data. Adding multi-factor authentication (MFA) as an additional login security layer significantly reduces risk, but many of today's MFA solutions have significant security flaws. Current second-factor authentication methods can easily be manipulated by attackers and bypassed using simple phishing or social engineering techniques.

While traditional MFA provides advantages, sites that use this approach are still subject to phishing attacks. To overcome this problem, various "phish-proof" push approaches have been developed. These phish-proof authentication techniques typically rely on standards such as FIDO, U2F and WebAuthN. To enable phish-proof protection, MFA is launched from an end user browser and typically utilizes a hardware component (e.g., a USB-type hardware authenticator that is a physical security key) to generate an MFA attestation or assertion. A next-generation MFA service, commercially available as Akamai® MFA, leverages FIDO2, which is the strongest standards-based authentication method available. In this service, a smartphone app is used in place of a physical security key to generate the MFA attestation. While this approach provides significant advantages, it requires a browser extension to hijack the FIDO request from the browser (and to relay it to the user's phone for generating the MFA attestation).

The approach herein provides for enhanced phish-proof authentication methods that do not require browser extensions or plug-ins for support.

SUMMARY OF THE INVENTION

A method of browser extensionless phish-proof multi-factor authentication (MFA). In one aspect, a MFA service is provided for authenticating a user to a site, the user having a computing machine, and an associated mobile device, the computing machine having a browser and a web storage application programming interface (API) with a local storage component. The service comprises hardware and associated software comprising program code. In association with enrollment of a user at the site, the service provides a script that, upon execution in the browser, stores a browser key pair comprising a public key, and an associated private key in the local storage component. An identifier for the MFA SaaS is also stored there. The public key of the browser key pair is linked to a list of sites that include the site and to which the user is permitted to authenticate using the MFA service.

Phish-proof MFA verifies that the browser the user is in front of is actually visiting the authentic (real) site and not a phished site. In general, this is achieved by only allowing MFA to be initiated from a user trusted browser by verifying its authenticity through a signing operation using a key only it possesses, and then also verifying that the verified browser is visiting the authentic site. In a preferred embodiment, this latter check is carried out using an iframe postMessage owning domain check. In a variant embodiment, the verified browser is verified to be visiting the authentic site through an ORIGIN header check. By using the iframe-based or ORIGIN header-based check, the solution does not require a physical security key (such as a USB authenticator) or any browser extension or plug-in.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF DRAWINGS

For a more complete understanding of the subject matter herein and the advantages thereof, reference is now made to the following descriptions taken in conjunction with the accompanying drawings, in which.

DETAILED DESCRIPTION OF THE INVENTION

Figure 1:
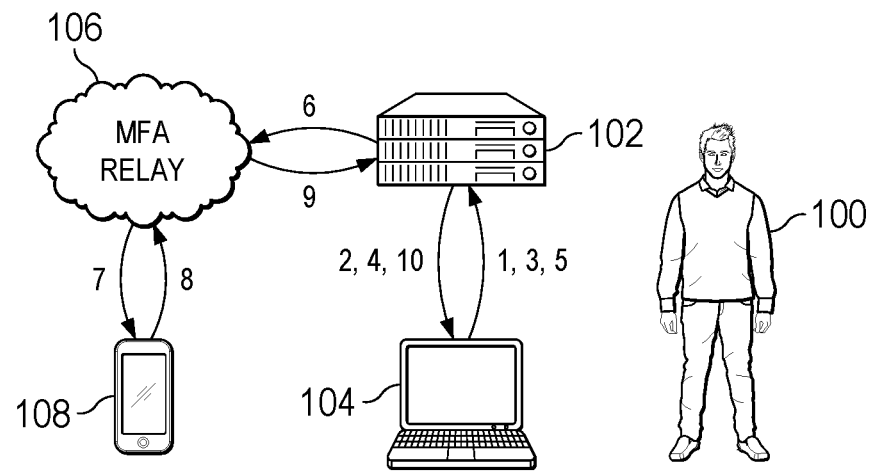
FIG. 1 depicts a traditional (simple) multi-factor authentication.

By way of background, FIG. 1 depicts a traditional (simple) multi-factor authentication (MFA) technique, wherein a real user 100 is visiting a real website 102 from his or her browser 104. An MFA relay (e.g., an identity provider) 106 is associated with the website 102, and the user 100 has an associated smartphone or the like 108 that has a message service. The MFA flow is depicted in detail in steps (1)-(10) as set forth below:

1. REAL USER VISITS REAL SITE
2. REAL SITE SEES NO SESSION; SENDS PAGE TO TYPE USERNAME AND PASSWORD
3. REAL USER SENDS USERNAME AND PASSWORD, WHICH ARE CORRECT
4. REAL SITE SENDS DOWN A PAGE REQUESTING MFA (CLICK HERE FOR PUSH!)
5. THE REQUEST TO DO MFA IS SENT TO THE REAL SITE
6. REAL SITE TELLS MFA RELAY SERVICE TO SEND AUTHENTICATION PUSH MESSAGE TO PHONE
7. PHONE RECEIVES MFA REQUEST

8. REAL USER CLICKS OK! ON PHONE WHICH SENDS A MESSAGE TO THE MFA RELAY SERVICE NOTING THAT THE END USER APPROVED
9. MFA RELAY SERVICE TELLS REAL SITE THE MFA WAS SUCCESSFUL
10. REAL SITE SENDS SOME SESSION COOKIE DOWN, LOGGING THE REAL USER IN.

Figure 2:
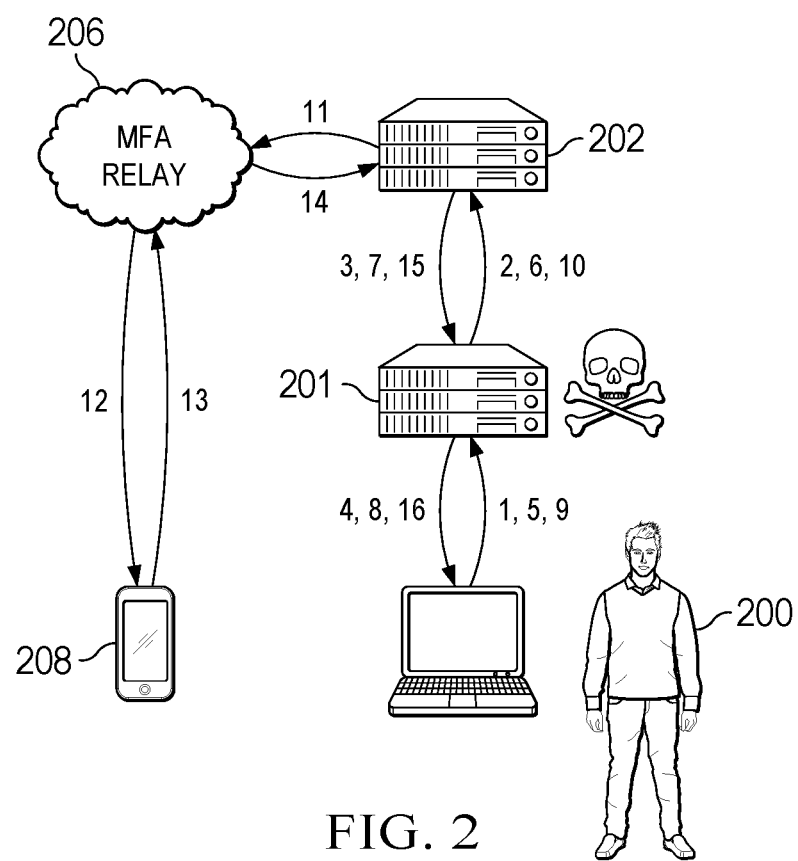
FIG. 2 depicts how the traditional MFA flow in FIG. 1 is phished (subject to a phishing attack)

FIG. 2 depicts how the traditional MFA flow is phished. In this example, the real user 200 is tricked into visiting a phishing site (e.g., www.bestbuyS.com) 201 instead of the real site 202. In this example, the phishing site is run by an attacker who mirrors the real content from the real website (www.bestbuy.com). The real user clicks on the login and enters his or her credentials in the phishing site. The attacker, running the phishing site, sees the real user's credentials. The attacker sends them to the real website, pretending to be the real user. The real site then kicks off an MFA challenge via the MFA relay 206 to the real user's phone 208, and the phish can then proceed. In this scenario, the real user thinks he or she is accessing the real site; once the MFA phone challenge is received, he or she just accepts it, which allows the attacker into the real site. The full phished MFA flow is depicted in detail in steps (1)-(16), as set forth below:

1. REAL USER VISITS PHISHING SITE
2. PHISHING SITE FORWARDS REQUEST TO THE REAL SITE
3. REAL SITE SEES NO SESSION; SENDS PAGE TO TYPE USERNAME AND PASSWORD
4. PHISHING SITE RELAYS THE PAGE TO THE REAL USER
5. REAL USER SENDS USERNAME AND PASSWORD, WHICH ARE CORRECT, TO PHISHING SITE
6. PHISHING SITE FORWARDS LOGIN CREDENTIALS TO THE REAL SITE
7. REAL SITE SENDS DOWN A PAGE REQUESTING MFA (CLICK HERE FOR PUSH!)
8. PHISHING SITE FORWARDS PAGE TO THE REAL USER
9. REAL USER SENDS REQUEST TO DO MFA TO THE PHISHING SITE
10. PHISHING SITE FORWARDS REQUEST TO THE REAL SITE
11. REAL SITE TELLS MFA RELAY SERVICE TO SEND AUTHENTICATION PUSH MESSAGE TO PHONE
12. PHONE RECEIVES MFA REQUEST
13. REAL USER CLICKS OK! ON PHONE WHICH SENDS A MESSAGE TO THE MFA RELAY SERVICE NOTHING THAT THE END USER APPROVED
14. MFA RELAY SERVICE TELLS REAL SITE THE MFA IS COMPLETE
15. REAL SITE SENDS LOGGED IN SESSION COOKIE/INFO TO PHISHING SITE
16. REAL USER IS HACKED.

The attacker's ability to phish the MFA flow occurs because the real user is confused into thinking that the actions he or she takes in his/her browser kicks off the MFA flow. In reality, however, it is the attacker's browser that kicks off the MFA, and that activity is timed to make it look like the real user is acting. Additionally, the real user is tricked because he/she does not realize that the phishing site is not the real site.

It is also known in the prior art to provide "phish-proof" push solutions that attempt to ameliorate the security gap depicted in FIG. 2. Phish-proof push is a bridge between the user experience flow of a regular push MFA and the more advanced under-the-hood security policies of U2F/WebAuthN/FIDO2. Typically, there are two components to this solution: a mobile authenticator, and an extension. The mobile authenticator is built into the service layer mobile device app. The extension can exist as either a browser extension (Chrome/Firefox/Safari, etc.) or as a desktop agent (kernel extension) acting as a virtual USB authenticator. In either case, the extension injects cause the browser to think it is the hardware/platform authenticator and instead forwards those messages along an encrypted/authentication channel to the mobile device app. A secure pairing protocol (of the browser to the mobile app) is used on demand by the user, e.g., by scanning a QR code, or out-of-band if there is another way of bootstrapping authentication between the extension and the mobile client.

Figure 3:
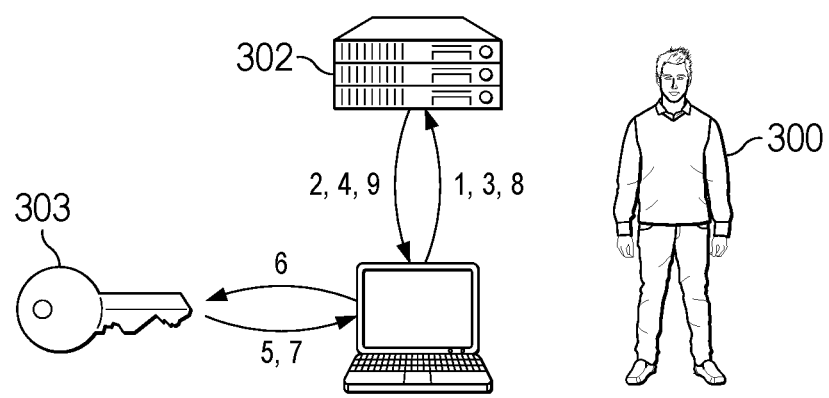
FIG. 3 depicts a phish-proof push solution that addresses security gaps in traditional MFA flows.

FIG. 3 depicts a representative phish-proof solution using a FIDO-based solution. There are several variants, but all FIDO protocols use standard public key cryptography to provide stronger authentication. In a representative approach, the real user 300 at some point registers a hardware authenticator (or "key") 303 (e.g., a Yubikey, a USB-type authenticator) with the real site (www.bestbuy.com) 302. Per the FIDO protocol, this causes a key pair to be created on the hardware authenticator 303 that is then assigned www.bestbuy.com internally. The public half of the key pair is stored with the real website 302. Then, when the real user 300 visits www.bestbuy.com via his or her browser and MFA is enabled after log-in, the real website sends down a random number to be signed. The real user's browser, through JavaScript, is told that this will be a FIDO MFA. The browser then prompts the real-user to put in an authenticator like the Yubikey to approve. Typically, the authenticator is inserted into a USB port of the user's computer. The browser then sends the key 303 the real site domain name and random number to be signed. The authenticator then looks up www.bestbuy.com, finds the private key, signs the value, and returns to key 303 the resulting payload over USB. This is sometimes referred to herein as generating an MFA attestation or assertion. The signed value is relayed back to the real-site, which checks with the public key to confirm that the user is who he or she purports to be and for the site www.bestbuy.com. The full phish-proof push flow is depicted in steps (1) through (9), as set forth below:

Prerequisites:
  A. YUBIKEY HAS AN ENTRY IN IT FOR realsite.com THAT HAS yubi_private AND yubi_public KEYS
  B. realsite.com ALREADY ENROLLED REAL USER, AND HAS yubi_public KEY
1. REAL USER VISITS REAL SITE
2. REAL SITE SEES NO SESSION, SENDS PAGE TO TYPE USER AND PASS
3. REAL USER SENDS USER AND PASS WHICH ARE CORRECT
4. REAL SITE SENDS DOWN A PAGE REQUESTING FIDO MFA WITH A RANDOM NUMBER "R"
5. THE USER INSERTS THE YUBI KEY
6. BROWSER SENDS IN THE NON-SPOOFABLE DOMAIN NAME OF realsite.com AND "R" FOR SIGNING
7. YUBIKEY SENDS BACK {"R", realsite.com}, AND A SIGNATURE OVER BOTH UTILIZING yubi_private
8. BROWSER SENDS ASSERTION TO THE REAL SITE 9. REAL SITE VERIFIES ASSERTION WITH yubi_public KEY AND SENDS DOWN LOGGED IN SESSION TO REAL USER.

Figure 4:
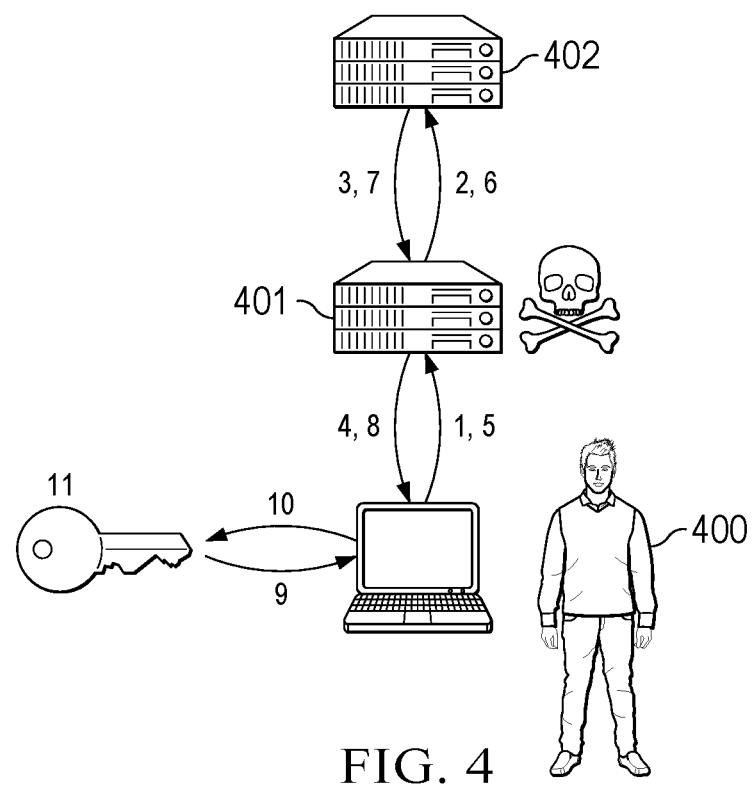
FIG. 4 depicts how the solution in FIG. 3 prevents the phishing attack from succeeding.

FIG. 4 depicts how the phish-proof solution in FIG. 3 circumvents the phishing attack. In this example, the phishing site (www.bestbuyS.com) 401 is once again present in the flow. As in FIG. 2, the real user 400 is tricked into visiting the phishing site 401, which is operated by the attacker who has mirrored the real content from the real site 402 www.bestbuyS.com is operated by Mallory. As before, the real user clicks on the login and enters his or her credentials into the phony site. The attacker, running the phishing site, sees the credentials. The attacker sends them to the real site, pretending to be the real user. The real site then kicks of a FIDO MFA challenge. The generated random number and associated information makes its way to the attacker instead of the real user. Because the attacker does not possess the Yubikey, however, the challenge is then passed down to the real user. The real user's browser recognizes a FIDO MFA challenge and requests the real user to insert the Yubikey. The real user inserts the key 403, and the browser then sends to the key the real site domain name and random number to be signed. In this case, however, the real site domain name (according to the real user's browser) is www.bestbuyS.com and not www.bestbuy.com. Because there is no key for the phishing site, the signing fails. The full phish-proof flow and how it prevents the phishing attack is depicted in FIG. 4 in steps (1)-(11), as set forth below:

Prerequisites:
A. YUBIKEY HAS AN ENTRY IN IT FOR realsite.com THAT HAS yubi_private AND yubi_public KEYS
B. realsite.com ALREADY ENROLLED REAL USER, AND HAS yubi_public KEY
1. REAL USER VISITS PHISHING SITE
2. PHISHING SITE FORWARDS REQUEST TO THE REAL SITE
3. REAL SITE SEES NO SESSION, SENDS PAGE TO TYPE USER AND PASS
4. PHISHING SITE RELAYS THE PAGE TO THE REAL USER
5. REAL USER SENDS USER AND PASS WHICH ARE CORRECT TO PHISHING SITE
6. PHISHING SITE FORWARDS LOGIN CREDENTIALS TO THE REAL SITE
7. REAL SITE SENDS DOWN A PAGE REQUESTING FIDO MFA WITH A RANDOM NUMBER "R"
8. PHISHING SITE FORWARDS PAGE TO THE REAL USER
9. THE USER INSERTS THE YUBIKEY
10. BROWSER SENDS IN THE NON-SPOOFABLE DOMAIN NAME OF PHISHINGSITE.com AND "R" FOR SIGNING
11. YUBIKEY DOES NOT HAVE AN ENTRY FOR PHISHINGSITE.com, AND THE PROCESS FAILS.

Figure 5:
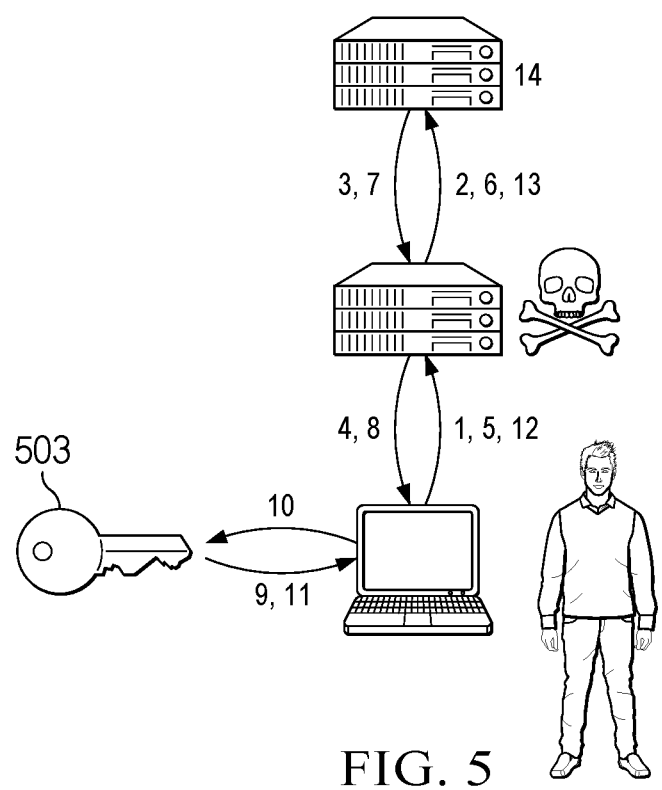
FIG. 5 depicts a variant to FIG. 4 wherein the hardware authenticator also includes an entry for the phishing site.

FIG. 5 depicts a variant use case to FIG. 4 wherein the hardware authenticator also has a key 503 associated with the phishing site itself. In this embodiment, and even if the hardware authenticator has an entry for the phishing site 501, the payload signed is for the phishing site 501 and not the real site 502 and thus cannot be relayed back to the real website for further checking. The full phish-proof flow and how it prevents the phishing attack is depicted in steps (1)-(14), as set forth below:

Prerequisites:
A. YUBIKEY HAS AN ENTRY IN IT FOR realsite.com THAT HAS yubi_private_real AND yubi_public_real KEYS
B. YUBIKEY HAS AN ENTRY IN IT FOR PHISHINGSITE.com THAT HAS yubi_private_phish AND yubi_public_phish KEYS
C. realsite.com ALREADY ENROLLED REAL USER, AND HAS yubi_public_real KEY
1. REAL USER VISITS PHISHING SITE
2. PHISHING SITE FORWARDS REQUEST TO THE REAL SITE
3. REAL SITE SEES NO SESSION, SENDS PAGE TO TYPE USER AND PASS
4. PHISHING SITE RELAYS THE PAGE TO THE REAL USER
5. REAL USER SENDS USER AND PASS WHICH ARE CORRECT TO PHISHING SITE
6. PHISHING SITE FORWARDS LOGIN CREDENTIALS TO THE REAL SITE
7. REAL SITE SENDS DOWN A PAGE REQUESTING FIDO MFA WITH A RANDOM NUMBER "R"
8. PHISHING SITE FORWARDS PAGE TO THE REAL USER
9. THE USER INSERTS THE YUBIKEY
10. BROWSER SENDS IN THE NON-SPOOFABLE DOMAIN NAME OF PHISHINGSITE.com AND "R" FOR SIGNING
11. YUBIKEY SENDS BACK {"R", PHISHINGSITE.com}, AND A SIGNATURE OVER BOTH UTILIZING yubi_private_phish
12. BROWSER SENDS ASSERTION TO THE PHISHING SITE. PHISHING SITE CAN VERIFY REAL USER MFA'D
13. PHISHING SITE SENDS FORWARD ASSERTION TO THE REAL SITE
14. REAL SITE CANNOT VERIFY SIGNATURE WITH yubi_public_real AND SITE IN ASSERTION IS WRONG. REJECTED!.

The FIDO-based solution makes it so only the real user's browser can do the MFA (as the real user and not the attacker possesses the hardware key). It also ensures that the browser (and not the real user, who can be tricked visually) sends the real domain name into the hardware key and looks for an associated key for that domain. In the phishing case, however, this real domain is the phishing site.

Figure 6:
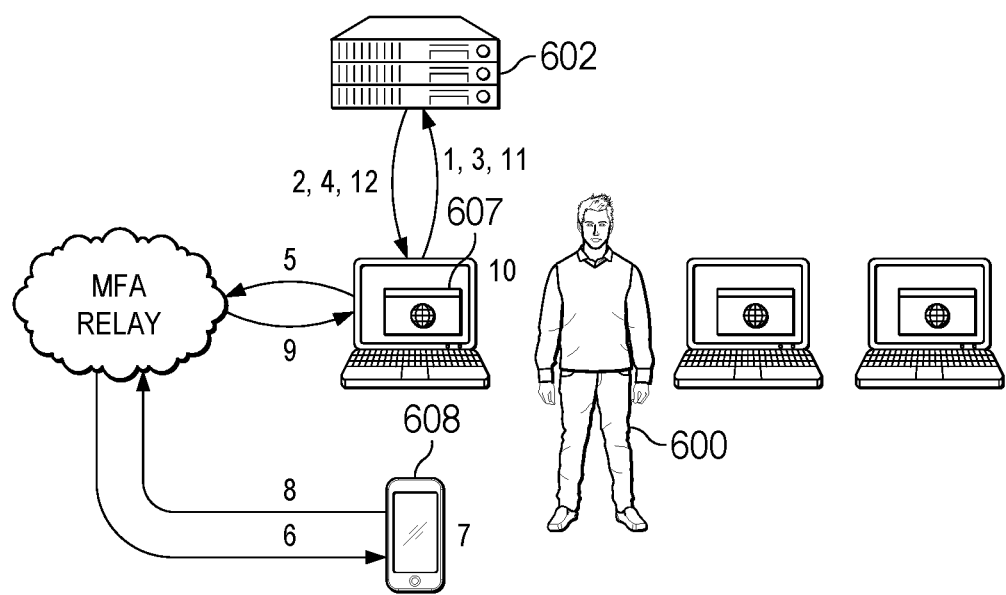
FIG. 6 depicts a variant phish-proof push solution using just the real user's smart phone or the like in lieu of a separate USB-type authenticator.

FIG. 6 depicts a phish-proof solution that leverages the user's own smartphone device 608 in lieu of requiring a separate USB-type authenticator. Instead of requiring a hardware USB-type authenticator like the Yubikey, one representative phone-based authenticator workflow is as follows. This workflow begins with the real user 600 with browser 604. At some point the real user 600 installs a browser extension (or plug-in) 607 that serves two (2) purposes, it establishes a unique pairing with the real user's phone 608, and it can intercept and hijack FIDO requests and redirect them to the phone 608. Thereafter, when the real user visits the real site 602 and is requested to MFA after logging in, the real site sends down the random number to be signed. The real user's browser, through JavaScript, is told this will be a FIDO MFA. The browser extension 607 captures this and sends the random number/challenge data and the real domain name to the user's phone 608, e.g., over a TCP/IP relay service. This capture operates in lieu of having the browser execute its normal flow (with USB and the hardware authenticator) as described above. The user's phone app knows about www.bestbuy.com (in this example) and operates exactly like the hardware authenticator except remotely, finally sending the signed assertion back to the browser plug-in, which in turn patches it back into the normal U2F flow. The signed value is then relayed back to the server, which checks with the public key and knows that it is for the real user and for the real site. The full phone-based phish-proof push flow is depicted in steps (1) through (12), as set forth below:

Prerequisites:
  A. EACH BROWSER REAL USER OWNS HAS A browser_public KEY AND browser_private KEY
  B. THE REAL USER'S PHONE HAS THE LIST OF browser_public KEYS
  C. THE REAL SITE DOMAIN, realsite.com, HAS A SET OF KEYS IN THE REAL USER'S PHONE: real_private KEY AND real_public KEY
  D. THE REAL SITE HAS THE real_public KEY FOR THE REAL USER
  1. REAL USER VISITS REAL SITE
  2. REAL SITE SEES NO SESSION, SENDS PAGE TO TYPE USER AND PASS
  3. REAL USER SENDS USER AND PASS WHICH ARE CORRECT
  4. REAL SITE SENDS DOWN A PAGE REQUESTING FIDO MFA WITH A RANDOM NUMBER "R"
  5. BROWSER EXTENSION HIJACKS THE FIDO REQUEST, SIGNS THE REAL DOMAIN NAME OF realsite.com AND "R" WITH THE browser_private KEY AND SENDS THE REQUEST TO THE MFA RELAY IN THE CLOUD
  6. MFA RELAY SERVICE SENDS THE REQUEST TO THE REAL USER'S PHONE
  7. THE REAL USER CLICKS "OK!" AND THE PHONE SIGNS THE {"R", realsite.com} ASSERTION WITH real_private KEY
  8. ASSERTION IS SENT BACK TO THE MFA RELAY SERVICE
  9. MFA RELAY SERVICE SENDS ASSERTION BACK TO BROWSER EXTENSION
  10. BROWSER EXTENSION MERGES THE ASSERTION BACK INTO THE PAGE AS IF IT CAME FROM A YUBIKEY
  11. BROWSER SENDS ASSERTION TO REAL SITE
  12. REAL SITE LOGS IN REAL USER.

This solution provides the FIDO/U2F/WebAuthN phish-proof push, but using just the user's phone. As has been described, FIDO forces the MFA to be launched from the real end user's browser and makes sure that the component (i.e., hardware authenticator, or smartphone, as the case may be) that is going to generate an MFA attestation is given the true domain name that the browser sees. While this approach provides significant advantages, it requires a browser extension to hijack the FIDO request from the browser and the treatment of the request in a different manner (relaying it remotely rather than handling locally over USB).

Browser Extensionless Phish-Proof Multi-Factor Authentication (MFA)

With the above as background, one preferred technique of this disclosure is now described. At a high level, the technique herein in effect replaces FIDO/U2F with browser native JavaScript, cross site protections, HTML5 local storage or cookies, and Web Crypto. It begins with site/business enrollment. In particular, assume the website obtains an MFA-type service (e.g., mfa.akamai.com) from a service provider. The service provider gives the site (e.g., www.bestbuy.com) an integration key (e.g., integration_key_public) that is the public key of a public key pair; the service provider keeps the private key (integration_key_private) of the integration key pair. This completes the enrollment of the website for the MFA service. An end user enrolls in the MFA service by visiting an enrollment web page for the site, (e.g.,  mfa.akamai.com/enroll/www.bestbuy.com). The service pushes down a JavaScript that checks the browser's HTML5 local storage for a key pair, such as browser_key_private and browser_key_public. If such a key pair does not exist, the JavaScript creates and stores it under the HTML5 local storage for mfa.akamai.com. It also sends the public key to mfa.akamai.com. The service then links the browser_public_key to a list of sites to which the user is allowed to authenticate using the service. In this example, www.bestbuy.com is added to the list. This completes the user enrollment for the website. The user enrolls in other participating sites in a similar manner. The MFA flow may then proceed as follows, and as depicted in a first embodiment in FIG. 7.

In particular, the real end user 700 logs into www.bestbuy.com 702, which desires to issue the MFA challenge. In lieu of the usual workflow as described above, the site 702 sends down to the browser a web page that includes a JavaScript that, upon execution, carries out the following operations. It creates an iframe 709 that is invisible and that opens to a particular service verification page (e.g., mfa.akamai.com/verify). The service verification page downloads JavaScript to the iframe that is running in the context of mfa.akamai.com. The main page 711 (www.bestbuy.com) then performs a window.postMessage to the iframe requesting an MFA challenge with a given random number that has been generated. The iframe catches the posted message but also gets the real name of the site that posted it. This is a feature of the native window.postMessage browser call. The enclaved iframe running in the context of the mfa.akamai.com service now knows the real identity of the site, the random number, and it also has access to the browser_private_key in the mfa.akamai.com HTML5 local storage (which only code from mfa.akamai.com can see). HTML5 local storage is a component of the Web storage application programming interface (API). It is a method by which Web pages locally store named key/value pairs inside a client's Web browser. Local storage is mainly used to store and retrieve data in HTML pages from the same domain.

Figure 7:
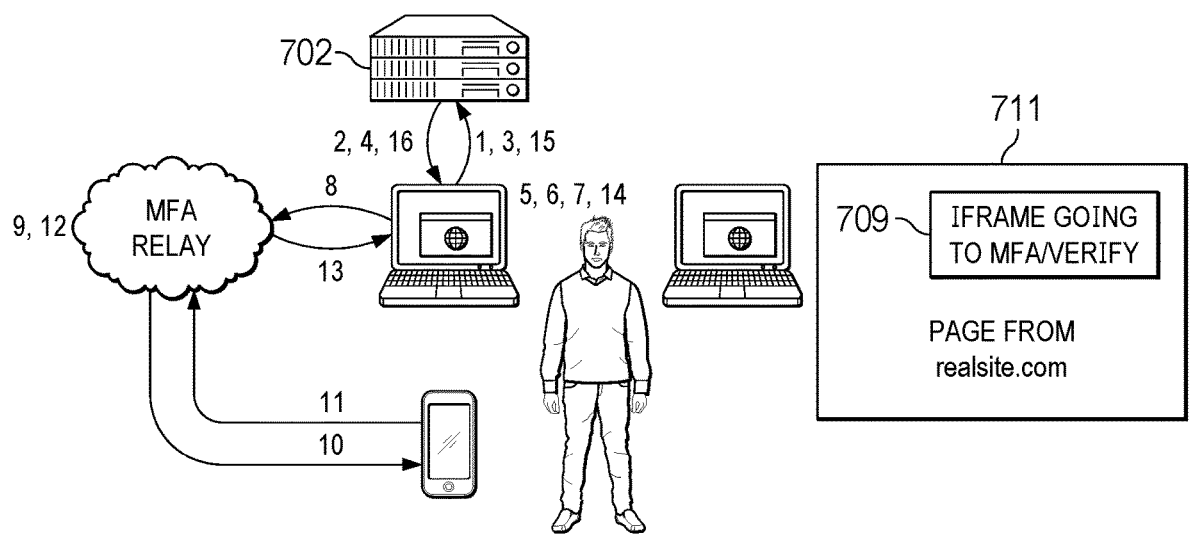
FIG. 7 depicts a first embodiment of this disclosure wherein an iframe postMessage owning domain check is used to verify that a browser is visiting an authentic site.

Returning back to the workflow, the iframe then sends one or more messages to service mfa.akamai.com with the real domain name and random number, signed such that the mfa.akamai.com service knows these messages are coming from the real user's browser. The mfa.akamai.com service then kicks off similar flows such as in the phone-based embodiment described above (e.g., in FIG. 8), checks to see if the real user 700 approved and, if so, signs the assertion with the integration_private_key. The signed assertion is then delivered back to the iframe, which then posts it over the wall (of the iframe) to the actual site's code (running in the browser), which in turn then captures and sends it up to the site itself. The site then verifies the assertion with the integration_public_key to complete the process. FIG. 7 steps (1)-(16) as set forth below depict this operation in a first embodiment.

Knowledge Prerequisites:
  1. HTML5 LOCAL-STORAGE CAN ONLY BE READ BY THE SITE THAT STORED DATA IN IT
  2. CROSS SITE PROTECTIONS STOP FRAMES FROM READING EACH OTHER'S DATA IF FROM DIFFERENT SITES
  3. window.post.Message LETS FRAMES FROM DIFFERENT SITES ON THE SAME PAGE COMMUNICATE SELECTIVELY
  4. window.post.Message DELIVERS A NON-SPOOFABLE ASSERTION OF THE CALLING FRAMES REAL DOMAIN NAME 5. A NON-SPOOFABLE ORIGIN HEADER IS SENT FROM A BROWSER WHEN PERFORMING A POST INDICATING THE SOURCE OF PAGE THAT CAUSED THE POST TO OCCUR Prerequisites:
- A. THE HTML5 LOCAL-STORAGE FOR mfa.akamai.com ON OUR GIVEN BROWSER ALREADY CONTAINS TWO KEYS: browser_public AND browser_private
- B. THE REAL SITE ALREADY HAS AN INTEGRATION KEY FROM AKAMAI'S MFA SERVICE FOR VERIFICATION OF ASSERTIONS: mfa_service_public
- C. mfa.akamai.com HAS BOTH mfa_service_public AND mfa_service_private KEYS AS WELL AS browser_public 1. REAL USER VISITS REAL SITE
2. REAL SITE SEES NO SESSION, SENDS PAGE TO TYPE USER AND PASS
3. REAL USER SENDS USER AND PASS WHICH ARE CORRECT
4. REAL SITE SENDS DOWN A PAGE THAT HAS TWO THINGS: AN MFA JavaScript FILE AKAMAI AND A RANDOM NUMBER "R"
5. THE JavaScript CREATES AN IFRAME THAT POINTS AT mfa.akamai.com/verify
6. THE JavaScript ON realsite.com's REAL PAGE DOES A window.post.Message TO THE IFRAME SENDING IN
7. THE !FRAME "CATCHES" THE MESSAGE AND ALSO GETS THE REAL DOMAIN NAME FROM THE CALL OF realsite.com
8. THE CODE RUNNING IN THE IFRAME THAT WAS DELIVERED FROM mfa.akamai.com CAN READ THE HTML5 LOCAL-STORAGE FOR mfa.akamai.com. IT READS THE browser_private KEY AND SIGNS THE REQUEST TO mfa.akamai.com THAT CONTAINS "R" AND realsite.com
9. THE mfa.akamai.com SERVICE VERIFIES THAT THE BROWSER IS THE REAL USERS BY CHECKING THE SIGNATURE WITH browser_public AND VERIFIES THE ORIGIN HEADER IS mfa.akamai.com
10. KNOWING THAT THE BROWSER IS LEGIT, IT FORWARDS THE REQUEST TO THE PHONE
11. REAL USER CLICKS OK! AND SENDS ASSERTION BACK TO THE mfa.akamai.com SERVICE
12. THE mfa.akamai.com SERVICE RE-SIGNS THE ASSERTION {"R", realsite.com} WITH mfa_service_private KEY
13. THE mfa.akamai.com SERVICE RESPONDS TO THE IFRAME REQUEST FROM #8 WITH THE ASSERTION
14. THE IFRAME window.post.Message's THE ASSERTION TO THE MAIN PAGE
15. THE MAIN PAGE SENDS THE ASSERTION TO THE REAL SITE
16. THE REAL SITE VERIFIES THE ASSERTION WITH mfa_service_public AND THE ORIGIN HEADER IS THE SITE ITSELF, AND LOGS THE USER IN.

In addition, in the above-described embodiment, cross-site scripting protection is facilitated by including a non-spoof-able origin header. This header is sent from a browser when performing an HTTP POST indicating the source of the page that causes the POST to occur.

Figure 8:
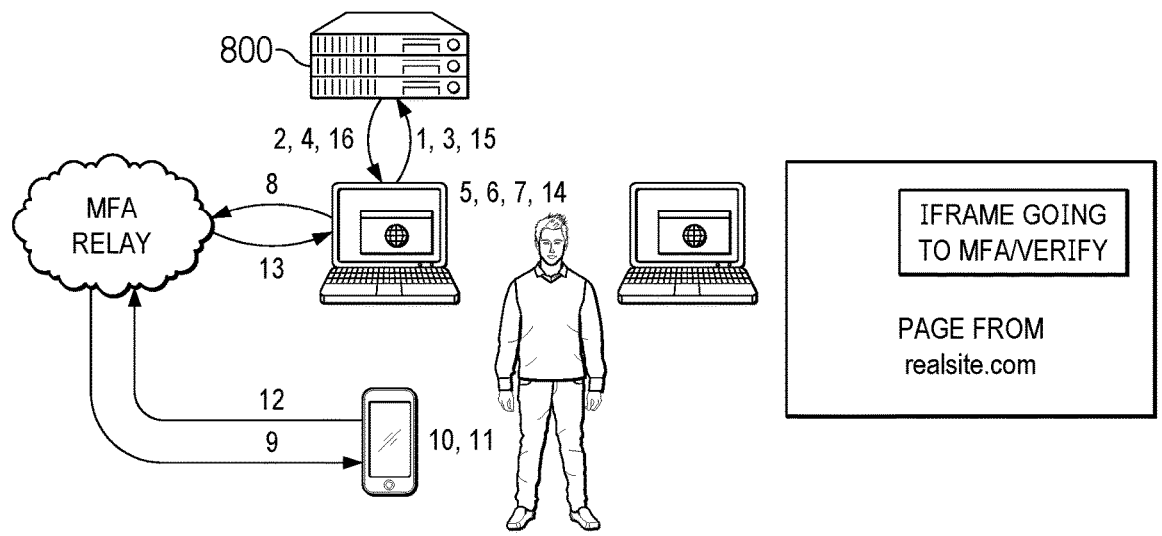
FIG. 8 depicts a variant embodiment using the iframe-based checking.

FIG. 8 depicts a variant embodiment of FIG. 7 in which there are several prerequisites: HTML5 local storage for mfa.akamai.com on the given browser already contains two keys (browser_public, and browser_private), the real site 802 already has a public per-user key for the real user (user_public), the service mfa.akamai.com has browser_public (or a digest/ID for it) and a link to the real user's phone/account information, and the real user's phone 808 has user_public and user_private indexed under the site's domain, and browser_public. The MFA process flow in this embodiment is then as is described in steps (1)-(16), as set forth below:

Prerequisites:
- A. THE HTML5 LOCAL-STORAGE FOR mfa.akamai.com ON OUR GIVEN BROWSER ALREADY CONTAINS TWO KEYS: browser_public AND browser_private
- B. THE REAL SITE ALREADY HAS A PUBLIC PER-USER KEY FOR THE REAL USER CALLED user_public
- C. mfa.akamai.com HAS browser_public (OR A DIGEST/ID FOR IT) AND A LINK TO REAL USER'S PHONE/ACCOUNT INFO
- D. THE REAL USER'S PHONE HAS user_public AND user_private INDEXED UNDER realsite.com AND browser_public 1. REAL USER VISITS REAL SITE
2. REAL SITE SEES NO SESSION, SENDS PAGE TO TYPE USER AND PASS
3. REAL USER SENDS USER AND PASS WHICH ARE CORRECT
4. REAL SITE SENDS DOWN A PAGE THAT HAS TWO THINGS: AN MFA JavaScript FILE FROM AKAMAI AND A RANDOM NUMBER "R"
5. THE JavaScript CREATES AN !FRAME THAT POINTS AT mfa.akamai.com/verify
6. THE JavaScript ON realsite.com's REAL PAGE DOES A window.post.Message TO THE !FRAME SENDING IN THE RANDOM NUMBER "R"
7. THE !FRAME "CATCHES" THE MESSAGE AND ALSO GETS THE REAL DOMAIN NAME FROM THE CALL OF realsite.com
8. THE CODE RUNNING IN THE !FRAME THAT WAS DELIVERED FROM mfa.akamai.com CAN READ THE HTML5 LOCAL-STORAGE FOR mfa.akamai.com. IT READS THE browser_private KEY AND SIGNS THE REQUEST TO mfa.akamai.com THAT CONTAINS "R" AND realsite.com, ALSO SENDING ALONG AN IDENTIFIER OR HASH FOR THE browser_public KEY USED
9. THE mfa.akamai.com SERVICE VERIFIES THE SIGNATURE AND THAT THE ORIGIN HEADER IS mfa.akamai.com, AND IF CORRECT, FORWARDS THE REQUEST TO THE ASSOCIATED PHONE FOR THE ACCOUNT
10. THE PHONE CHECKS THE SIGNATURE WITH browser_public AND RECOGNIZES IT AS VALID. IT PRESENTS A PROMPT FOR THE USER
11. REAL USER CLICKS OK! THE PHONE SIGNS THE ASSERTION {"R", realsite.com} WITH THE ASSOCIATED PRIVATE KEY LISTED UNDER realsite.com (user_private)
12. THE PHONE SENDS THE ASSERTION BACK TO mfa.akamai.com
13. THE mfa.akamai.com SERVICE RESPONDS TO THE !FRAME REQUEST FROM #8 WITH THE ASSERTION 14. THE IFRAME window.post.Message's THE ASSERTION TO THE MAIN PAGE
15. THE MAIN PAGE SENDS THE ASSERTION TO THE REAL SITE
16. THE REAL SITE VERIFIES THE SIGNATURE USING user_public AND THE ORIGIN HEADER IS THE SITE ITSELF, AND SENDS A SESSION TO THE BROWSER.

In both embodiments (FIG. 7 and FIG. 8), the technique leverages a built-in browser call (in this example, window.postMessage) that allows frames from different sites on the same page to send messages to each other. As noted above, the window.postMessage from an outer page to an inner iframe is guaranteed to give the real domain name (actual or phishing). This is similar to FIDO giving the real domain name to the hardware key. Advantageously, however, the code in the iframe is the only component that can access the special browser_private_key.

Figure 9:
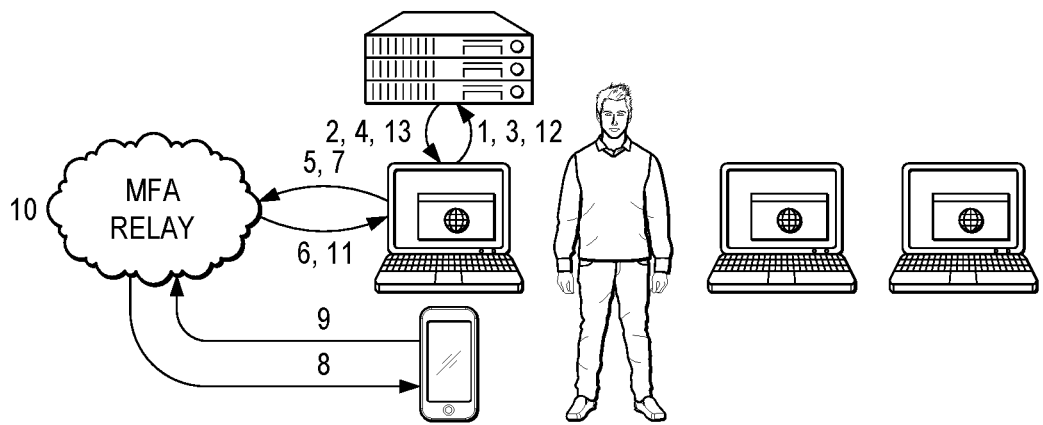
FIG. 9 depicts a second embodiment of this disclosure that uses ORIGIN header checks to verify that a verified browser is visiting an authentic site.

FIG. 9 depicts another embodiment of the browser extension-less phish proof MFA technique of this disclosure. In this embodiment, there is no iframe required, as the phish proof MFA mechanism is provided through ORIGIN header checks and HTML5 local storage or indexedDB. The indexedDB provides a flat-file database with hierarchical key/value persistence and basic indexing. For this embodiment, the knowledge prerequisites are: (1) that HTML5 local storage or indexedDB can only be read by the site that stored data in it, and (2) a non-spoofable ORIGIN header is sent from the browser when performing a POST and that indicates the source of the page that caused the POST to occur. The browser's local store (however implemented) for the mfa.akamai.com service on the browser contains the browser_public and browser_private keys, and the real site has an integration key mfa_service_public from the service for verification of assertions. The service has both mfa_service_public and mfa_service_private keys as well as the browser_public key. The real site 902 has a configured MFA consumption URL, or MFACURL. FIG. 9 steps (1)-(13) as described below depict this complete workflow operation.

Knowledge Prerequisites:
1. HTML5 LOCAL-STORAGE CAN ONLY BE READ BY THE SITE THAT STORED DATA IN IT
2. A NON-SPOOFABLE ORIGIN HEADER IS SENT FROM A BROWSER WHEN PERFORMING A POST INDICATING THE SOURCE OF PAGE THAT CAUSED THE POST TO OCCUR Prerequisites:
A. THE HTML5 LOCAL-STORAGE FOR mfa.akamai.com ON OUR GIVEN BROWSER ALREADY CONTAINS TWO KEYS: browser_public AND browser_private
B. THE REAL SITE ALREADY HAS AN INTEGRATION KEY FROM AKAMAI'S MFA SERVICE FOR VERIFICATION OF ASSERTIONS: mfa_service_public
C. mfa.akamai.com HAS BOTH mfa_service_public AND mfa_service_private KEYS AS WELL AS browser_public
D. THE REAL SITE HAS A CONFIGURED MFA CONSUMPTION URL, HENCEFORTH KNOWN AS THE MFACURL 1. REAL USER VISITS REAL SITE
2. REAL SITE SEES NO SESSION, SENDS PAGE TO TYPE USER AND PASS
3. REAL USER SENDS USER AND PASS WHICH ARE CORRECT
4. REAL SITE SENDS DOWN A PAGE THAT HAS A FORM ON IT WITH A TARGET URL OF https://mfa.akamai.com/prepare, A HIDDEN VARIABLE CONTAINING A RANDOM NUMBER "R", A HIDDEN VARIABLE CALLED "STATE" CONTAINING OPAQUE STATE INFORMATION FOR THE SITE, A FORM METHOD OF POST, AND OPTIONALLY JavaScript TO "AUTO-SUBMIT" THE FORM (KNOWN IN THE ART AS A POST-BIND)
5. THE USER'S WEB BROWSER POSTS THE FORM TO https://mfa.akamai.com/prepare
6. mfa.akamai.com CHECKS THE ORIGIN HEADER TO DETERMINE THE INITIATING SITE. IT THEN SENDS DOWN A WEB PAGE TO THE BROWSER THAT CONTAINS A BLOB OF DATA COMPRISED OF THE RANDOM NUMBER "R", THE "STATE" VARIABLE, AND THE ORIGIN DOMAIN NAME, ALONG WITH JavaScript THAT WILL SIGN THE BLOB USING THE BROWSER'S HTML5 LOCAL-STORAGE browser_private AND THEN POST THE SIGNED BLOB TO https://mfa.akamai.com/verify
7. THE mfa.akamai.com SERVICE RECEIVES THE POST AND VERIFIES THAT THE BROWSER IS THE REAL USERS BY CHECKING THE SIGNATURE WITH browser_public AND ALSO CONFIRMS THE ORIGIN HEADER IS NOW mfa.akamai.com
8. KNOWING THAT THE BROWSER IS LEGIT, IT FORWARDS THE REQUEST TO THE PHONE
9. REAL USER CLICKS OK! AND SENDS ASSERTION BACK TO THE mfa.akamai.com SERVICE
10. THE mfa.akamai.com SERVICE RE-SIGNS THE ASSERTION {"R", "STATE", realsite.com} WITH mfa_service_private KEY
11. THE mfa.akamai.com SERVICE RESPONDS TO THE REQUEST FROM #7 WITH THE ASSERTION EMBEDDED i IN A HIDDEN FIELD IN A FORM WITH TARGET MFACURL AND METHOD POST, AND OPTIONALLY JavaScript TO "AUTO-SUBMIT" THE FORM
12. THE BROWSER SUBMITS THE FORM TO MFACURL
13. THE REAL SITE VERIFIES THE ASSERTION WITH mfa_service_public AND THE ORIGIN HEADER IS mfa.akamai.com, AND IF VALID, SETS APPROPRIATE SESSION INFORMATION AND USES THE "STATE" mfa.akamai.com, AND IF VALID, SETS APPROPRIATE SESSION INFORMATION AND USES THE "STATE" INFORMATION TO_RESUME WHERE IT LEFT OFF PRIOR.

In lieu of the real site sending a script that creates the iframe (e.g., FIG. 8, step (4)), in this embodiment (FIG. 9, step (4)) the real site sends down a page that has a form on it with a target URL, e.g., mfa.akamai.com/prepare, a hidden variable containing a random number "R," a hidden variable called "state" containing opaque state information for the site, a form method of POST, and optionally Javascript to "auto-submit" the form. This is a POST-bind. When the user's web browser POSTS the form to mfa.akamai.com/ page, the service checks the ORIGIN header to determine the initiating site. The service then sends the browser a web page that contains a blob of data comprised of the random number "R," the "state" variable, and the ORIGIN domain name, along with JavaScript that (in this embodiment) signs the blob using the browser's HTML5 local storage browser_private key and then POSTs the signed blob to a service verification page, mfa.akamai.com/verify. After the service receives and verifies that the browser is the real user (by checking the signature with the browser_public key. The service also confirms the ORIGIN header is now mfa.akamai.com. With this verification, the service knows the browser is legitimate, and the remaining workflow can then proceed. In particular, the service forwards the request to the user's phone. After the user is prompted and accepts the request, an assertion is sent back to the service, which re-signs the assertion {R, state, realsite.com} with the mfa_service_private key. The service then responds to the request (that generated the POST) with the assertion embedded in a hidden field in a form with the target MFACURL and method POST, and optionally JavaScript to auto-submit the form. The browser submits the form to MFACURL, and the real site verifies the assertion to complete the process.

Figure 10:
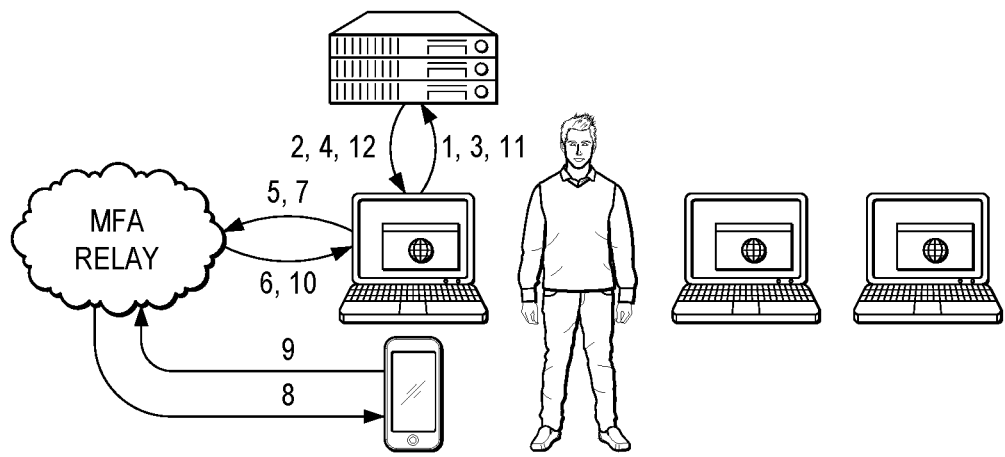
FIG. 10 depicts a variant embodiment using the ORIGIN header-based checking approach.

FIG. 10 as set forth below is a variant of the workflow in FIG. 9. The main difference between the two variants is that in FIG. 9 the service signs the assertion, whereas in FIG. 10 the user's phone signs the assertion.

Prerequisites:
A. THE HTML5 LOCAL-STORAGE FOR mfa.akamai.com ON OUR GIVEN BROWSER ALREADY CONTAINS TWO KEYS: browser_public AND browser_private
B. THE REAL SITE ALREADY HAS A PUBLIC PER-USER KEY FOR THE REAL USER CALLED: user_public
C. mfa.akamai.com HAS browser_public OR A DIGEST/ID FOR IT) AND LINK TO REAL USER'S PHONE/ACCOUNT INFO
D. THE REAL USER'S PHONE HAS user_public AND user_private INDEXED UNDER realsite.com AND browser_public
E. THE REAL SITE HAS A CONFIGURED MFA CONSUMPTION URL, HENCEFORTH KNOWN AS THE MFACURL 1. REAL USER VISITS REAL SITE
2. REAL SITE SEES NO SESSION, SENDS PAGE TO TYPE USER AND PASS
3. REAL USER SENDS USER AND PASS WHICH ARE CORRECT
4. REAL SITE SENDS DOWN A PAGE THAT HAS A FORM ON IT WITH A TARGET URL OF https://mfa.akamai.com/prepare, A HIDDEN VARIABLE CONTAINING A RANDOM NUMBER "R", A HIDDEN VARIABLE CALLED "STATE" CONTAINING OPAQUE STATE INFORMATION FOR THE SITE, A FORM METHOD OF POST, AND OPTIONALLY JavaScript TO "AUTO-SUBMIT" THE FORM (KNOWN IN THE ART AS A POST-BIND)
5. THE USER'S WEB BROWSER POSTS THE FORM TO https://mfa.akamai.com/prepare
6. mfa.akamai.com CHECKS THE ORIGIN HEADER TO DETERMINE THE INITIATING SITE. IT THEN SENDS DOWN A WEB PAGE TO THE BROWSER THAT CONTAINS A BLOB OF DATA COMPRISED OF THE RANDOM NUMBER "R", THE "STATE" VARIABLE, AND THE ORIGIN DOMAIN NAME, ALONG WITH JavaScript THAT WILL SIGN THE BLOB USING THE BROWSER'S HTML5 LOCAL-STORAGE browser_private AND THEN POST THE SIGNED BLOB TO https://mfa.akamai.com/verify
7. THE mfa.akamai.com SERVICE RECEIVES THE POST AND VERIFIES THAT THE BROWSER IS THE REAL USERS BY CHECKING THE SIGNATURE WITH browser_public AND ALSO CONFIRMS THE ORIGIN HEADER IS NOW mfa.akamai.com
8. KNOWING THAT THE BROWSER IS LEGIT, IT FORWARDS THE REQUEST TO THE PHONE
9. REAL USER CLICKS OK! THE PHONE SIGNS THE ASSERTION {"R", "STATE", realsite.com} WITH THE ASSOCIATED PRIVATE KEY LISTED UNDER realsite.com (user_private) AND SENDS THE SIGNED ASSERTION BACK TO THE mfa.akamai.com SERVICE
10. THE mfa.akamai.com SERVICE RESPONDS TO THE REQUEST FROM #7 WITH THE ASSERTION EMBEDDED IN A HIDDEN FIELD IN A FORM WITH TARGET MFACURL AND POST METHOD, AND OPTIONALLY JavaScript to RE-SIGNS THE ASSERTION {"R", "STATE", realsite.com} WITH mfa_service_private KEY
11. THE BROWSER SUBMITS THE FORM TO MFA-CURL
12. THE REAL SITE VERIFIES THE ASSERTION USING user_public AND THE ORIGIN HEADER IS mfa.akamai.com, AND IF VALID, SETS APPROPRIATE SESSION INFORMATION AND USES THE "STATE" mfa.akamai.com, AND IF VALID, SETS APPROPRIATE SESSION INFORMATION AND USES THE "STATE" INFORMATION TO RESUME WHERE IT LEFT OFF PRIOR.

Generalizing, in all embodiments herein (both iframe-based and ORIGIN header-based), the workflow verifies that the browser the user is in front of is actually visiting the authentic (real) site and not a phished site. This is achieved by only allowing MFA to be initiated from a user trusted browser by verifying its authenticity through a signing operation using a key only it possesses and then also verifying that the verified browser is visiting the authentic site (in one case through the iframe postMessage owning domain check, and in the other case through an ORIGIN header).

Other Enabling Technologies

A representative mobile device is an Apple iPhone®, iPad® or iPad2, iPad Mini, an Android™-based smartphone or tablet, a Windows®-based smartphone or tablet, a wearable, an Internet-of-Things (IoT) device, or the like. A representative mobile device comprises a CPU (central processing unit), such as any Intel- or AMD-based chip, computer memory, such as RAM, and a drive. The device software includes an operating system (e.g., Apple iOS, Google® Android™, or the like), and generic support applications and utilities 510 The device may also include a graphics processing unit (GPU). In particular, the mobile device also includes a touch-sensing device or interface configured to receive input from a user's touch and to send this information to the processor. The touch-sensing device typically is a touch screen. The touch-sensing device or interface recognizes touches, as well as the position, motion and magnitude of touches on a touch sensitive surface (gestures). In operation, the touch-sensing device detects and reports the touches to the processor, which then interprets the touches in accordance with its programming.

More generally, the techniques described herein are provided using a set of one or more computing-related entities (systems, machines, processes, programs, libraries, functions, or the like) that together facilitate or provide the functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines. The functionality may be provided as a service, e.g., as a SaaS solution. An edge compute instance may be supported in a virtual environment.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system (running TCP) or the like.

The functionality may be implemented with other application layer protocols besides HTTPS, such as SSL VPN, or any other protocol having similar operating characteristics.

The techniques herein may be used irrespective of the traffic type.

There is no limitation on the type of computing entity that may implement the client-side or server-side of the connection. Any computing entity (system, machine, device, program, process, utility, or the like) may act as the client or the server.

Finally, while given components of the system have been described separately, one of ordinary skill will appreciate that some of the functions may be combined or shared in given instructions, program sequences, code portions, and the like.

The techniques herein provide for improvements to a technology or technical field, namely, multi-factor authentication techniques, devices, systems, and the like.

Having described the subject matter herein, what is claimed is set forth as follows.

The invention claimed is:

1. A computer program product in a non-transitory computer readable medium, the computer program product holding computer program instructions that, when executed by a processor in a computing machine, facilitate a browser extension-less phish proof authentication of a user to a site, the user having a mobile device, the computer program instructions comprising program code configured to:
   during a multi-factor authentication (MFA) workflow initiated by the user logging into the site in association with a site page, transmitting a request to a service, the request having been generated at least in part by retrieving a private key of a browser key pair and using the private key of the browser key pair to create a signature over an assertion comprising a random value and a domain name of the site page; and
   responsive to a successful push notification at the mobile device, the successful push notification having occurred as a result of the service verifying the signature using a public key of the browser key pair and then forwarding the assertion to the mobile device, completing the MFA workflow.

2. The computer program product as described in claim 1, wherein the request is generated by an invisible iframe associated with the site page, the invisible iframe having been configured to create the request by catching a message from the site page that passes the random value and using the private key of the browser key pair to create the signature.

3. The computer program product as described in claim 2, wherein the message is a window.PostMessage message, and wherein the domain name of the site page is obtained from a window.postMessage browser call.

4. The computer program product as described in claim 1, wherein the request is generated by a form page that comprises a script and a blob of data, the blob of data comprising a hidden variable comprising the random value, a state variable containing opaque state information for the site of interest, and an origin domain name, the script being configured to create the request by signing the blob of data using the private key of the browser key pair.

5. The computer program product as described in claim 1, wherein the public key of the browser key pair is linked to a list of sites that include the site and to which the user is permitted to authenticate.

6. The computer program product as described in claim 1, wherein the MFA workflow verifies that a browser the user is using during the MFA workflow is actually visiting the site and not a phished site.

7. The computer program product as described in claim 6, wherein the MFA workflow uses an origin header check.

8. The computer program product as described in claim 1, wherein the browser extension-less phish proof authentication of the user to the site does not require a physical security key, a browser extension or a browser plug-in.

* * * * *